Feb. 28, 1967  H. L. SAXTON ETAL  3,307,141
WEDGE SCAN FOR ECHO LOCATING SYSTEM
Filed March 25, 1948  2 Sheets-Sheet 2
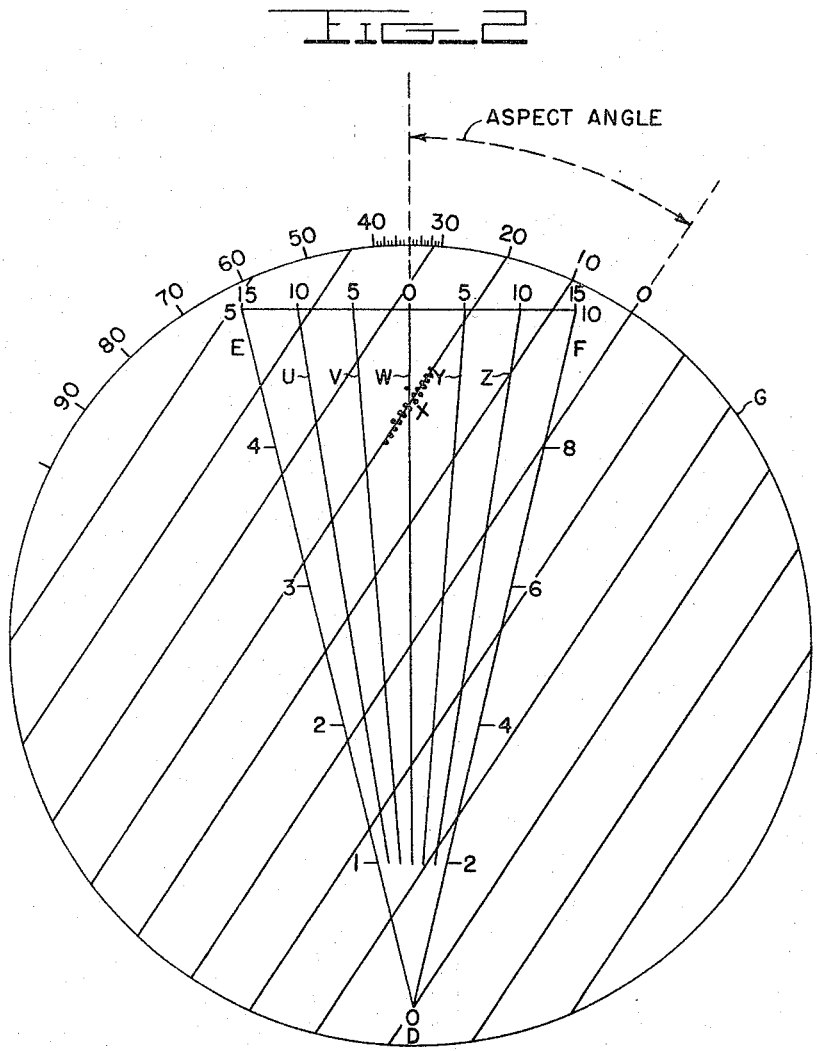
INVENTORS
HAROLD L. SAXTON
MELVIN S. WILSON
BY
ATTORNEY

United States Patent Office 3,307,141
Patented Feb. 28, 1967

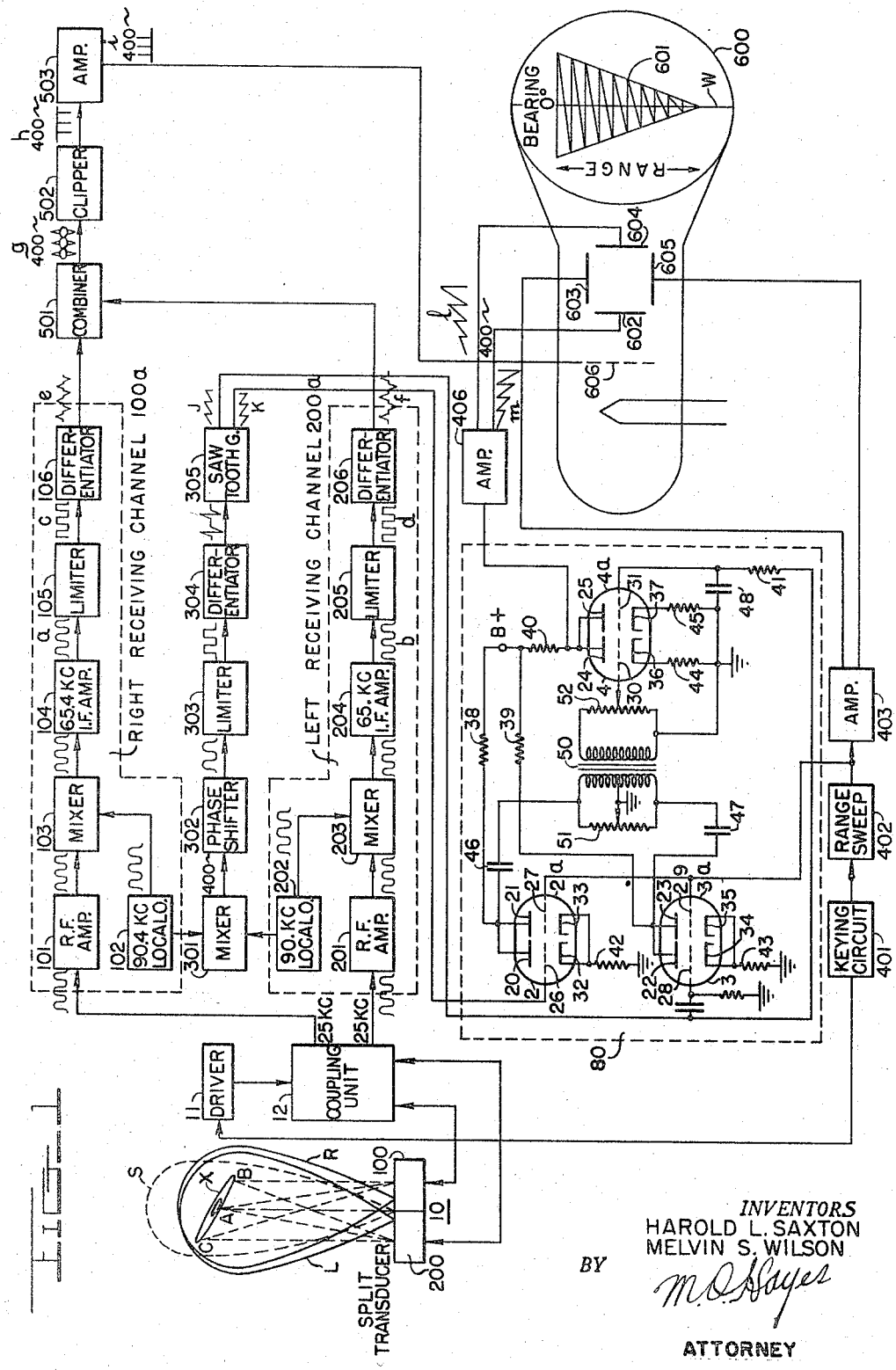

3,307,141
WEDGE SCAN FOR ECHO LOCATING SYSTEM
Harold L. Saxton, 7556 Broadview Road SE., Washington, D.C. 20022, and Melvin S. Wilson, Washington, D.C.
Filed Mar. 25, 1948, Ser. No. 16,894
6 claims. (Cl. 340—3)

The invention described herein may be manufactured and used by or for the Government of the United States of America for governmental purposes without the payment of any royalties thereon or therefore.

This invention relates in general to signal locator systems and in particular to a novel cathode ray tube indicator for signal locator systems such as described in the co-pending applications of H. L. Saxton, Serial No. 16,893 filed March 25, 1948, now U.S. Patent No. 3,024,441.

In said application there is disclosed a novel compressional wave pulse echo system for determining the range and bearing of a remote object or signal source. The system as described in said application displays object range and bearing by means of a television like scan produced on the viewing screen of a cathode ray tube indicator. Although this information may be interpreted to render correctly the azimuth and range, the "aspect" of the detected target is slightly distorted. That is, the heading of the target relative to the directional axis of the echo system is somewhat distorted.

The present invention, however, provides a novel method and means for horizontally sweeping the electron beam of a cathode ray tube indicator to produce a wedged shaped television like raster or scan thereon, to thereby faithfully reproduce the true aspect of the detected target.

It is accordingly an object of this invention to produce a wedge shaped television scan on a cathode ray tube indicator.

It is a further object of this invention to provide a suitable apparatus for accomplishing the above objective.

Another object of this invention is to provide a method and means whereby the true aspect angle of a target may be read directly from the screen of a cathode ray tube indicator.

Further objects and attainments of the present invention will become apparent upon a careful consideration of the following detailed description when read in conjunction with the accompanying drawings, in which:

FIG. 1 is a block schematic diagram of a locator system employing a typical embodiment of the present invention, and FIG. 2 illustrates a cursor used in conjunction with a calibrated screen for determining the aspect angle of a target.

To better illustrate and to more fully understand the purpose and function of the present invention it may best be described in conjunction, with the system set forth in aforementioned co-pending application of H. L. Saxton. It is to be understood, however, that the present invention is not to be limited to the system referred to, moreover the present invention may be embodied in any system employing a visual indicating means for determining range and/or bearing of an object or signal.

Referring now in particular to FIG. 1 there is provided in the locator system of the Saxton application supra, a suitable compressional wave transducer 10, split into a left hand element 200 and a right hand element 100, both operative upon transmission to form a single search beam S for transmission and right and left overlapping zones of receptivity, R and L, on reception. Connected to each of the elements 100 and 200 of the transducer 10 is a corresponding left and right superheterodyne receiving channel, indicated in general by the dotted lines, 100a and 200a. As taught in the Saxton application, object bearing is indicated from a horizontal scan on the cathode ray tube indicator 600. The production of this trace, and the apparatus used therefor, will now be briefly described with reference to the numerals in the 300 series. More particularly, local oscillator 102 of the right superheterodyne receiving channel and local oscillator 202 of the left superheterodyne receiving channel are tuned to distinct frequencies and their respective outputs are heterodyned together in a suitable mixer 301. By way of example, oscillator 102 is tuned to 90.4 kc. and oscillator 202 is tuned to 90 kc. The resulting 400 cycle frequency difference output from mixer 301 is fed through a phase shifter 302, a limiter 303, a differentiator 304 and then to a saw-tooth generator 305. The function of the limiter 303 and the differentiator 304 is to distort the sine wave output from phase shifter 302 and thus to produce a suitable keying voltage for the saw-tooth wave generator 305. The saw-tooth generator 305 is preferably of the type which produces a push-pull output as indicated in the drawing.

In the Sector Scan Indicator the saw-tooth generator produces a 400 cycle horizontal sweep trace of equal amplitude which is coupled to the horizontal deflecting plates of the cathode ray tube indicator 600. The present invention will be described later in a manner consistent with producing a modulated horizontal sweep to replace the conventional horizontal sweep of equal amplitude, thereby replacing the rectangular raster with a wedge shaped raster.

To indicate object range the 400 cycle horizontal bearing trace is stretched out in a vertical plane to produce a television like raster. The range axis is along the vertical axis. For this purpose the components designed by reference characters of the 400 series are added, and comprise a keying circuit 401 operative to produce synchronizing impulses for producing simultaneous operation of the transmitter 11, and range sweep generator 402, the latter producing a saw-tooth sweep of 4 or 5 seconds duration for example. The voltage from saw-tooth generator 402 is amplified by amplifier 403 and applied as a push-pull deflection signal to the vertical deflecting plates 603 and 605 of cathode ray indicator 600. This current is so synchronized with the transmission of the search pulses that the horizontal lines are deflected to the bottom of the screen of cathode ray indicator 600 at the instant of the pulse transmission and thereafter progress upward in such a manner that a raster is produced similar to that in television. The vertical displacement from the bottom is therefore proportional to range. The range proportionality constant may be chosen to make the top of the vertical sweep correspond to any desired range.

On reception an echo returning from the axis of directivity of the transducer, as from point A of target X, impinges on the left element 200 and the right element 100 of the transducer simultaneously. This response initiates a simultaneous series of actions in the left and right superheterodyne receiving channels 200a and 100a respectively. The signal from the right element 100 of the transducer 10 is fed into the channel with the local oscillator of higher frequency. In the right and left superheterodyne mixers 103 and 203 phases, as well as frequencies, are subtracted. Thus if the two incoming signals from the left and right elements of the transducer 10 are in phase, and which they are when energy is received from the axis of directivity, the two intermediate frequencies have a relative phase identical with that of the local oscillators 102 and 202 when heterodyned to produce a horizontal sweep on the cathode ray tube.

The outputs designated at $a$ and $b$ of each intermediate frequency amplifier 104 and 204 of FIG. 1 is limited in a conventional manner by the limiter 105 in the right channel and limiter circuit 205 in the left channel, thereby producing square waves $c$ and $d$. The square waves at intermediate frequencies, are differentiated in suitable differentiating circuits 106 of right channel and 206 of the left channel, to produce sharp voltage pulses $e$ and $f$. These voltages pips $e$ and $f$ which are still at intermediate frequencies are added together in the combiner circuit 501 to produce extra high amplitude voltage pips $g$ when they occur at the same instant, as they do at a rate of 400 cycles per second. Only these extra high pips break through an amplifier biased below cutoff in the clipper circuit 502, producing a 400 cycle unidirectional pip $h$. After proper filtering, inverting and amplifying, in amplifier circuit 503 these sharp pips $i$ are applied to the intensity grid 606 of the cathode ray tube indicator 600.

When the left and right elements of the transducer receive the signal simultaneously, as they would if the signal originated from the axis of directivity of the transducer 10 of FIG. 1, the two intermediate frequencies have a relative phase identical with that of the local oscillators. That is, the phase coincidence of the two intermediate frequencies equals the phase coincidence of the two local oscillators. The resulting voltage pulses $i$, applied to the intensifying grid 606, thus brightening a spot on the center of the horizontal saw-tooth sweep. This brightened spot on the center line of the cathode ray tube indicator is representative of zero bearing of the target, as the signals were received from the axis of directivity of the split transducer. To assure correspondence between the bearing indication provided by the indicator 600 and the actual direction of signal arrival, phase shifter 302 is added to the bearing sweep channel. Phase shifter 302 is adjusted to bring echo indications produced by a known target lying on the axis of directivity into coincidence with the center line W on the face of the indicator 600.

In a similar manner a signal received from point B of target X, that is to say for example, displaced angularly to the right of the axis of directivity of the split transducer impinges on the right element 100 of the transducer 10 before it reaches the left element 200, giving rise to a phase lead in the right element response ahead of the left element response. Then, because of subtraction of phases in the mixers 103 and 203, the intermediate frequencies have a retarded phase when added in the combiner 501 and clipped by the clipper circuit 502. In this condition the horizontal sweep on the cathode ray tube indicator 600 will have progressed beyond the center line W to the right, before the two intermediate frequencies are at phase coincidence, and the resulting voltage pip $i$ is applied to the intensifying grid 606. In this case a spot will be brightened at a point intermediate the center and the extreme right, indicating off bearing to the right.

Again in a similar manner a signal received from point C of target X, that is to say for example again, displayed angularly to the left of the axis of directivity of the split transducer impinges on the left element of the transducer before it reaches the right element, giving rise to a phase lag in the right element response behind that of the left element response. Then, again because of subtraction of phases in the mixers 103 and 203 the intermediate frequencies, when added in the combiner 501 and clipped in the clipper circuit 502, have an advanced phase. In this condition the horizontal sweep on the cathode ray tube indicator 600 will be progressing from extreme left to the center, before the two intermediate frequencies are at phase coincidence, and the resulting voltage $i$ is applied to the intensifying grid 606. In this case a spot is brightened at a point intermediate the extreme left and center indicating off bearing to the left. The displacement of the indication appearing on indicator 600 from the center line W is proportional to the angular displacement of the target from the axis of directivity of the transducer 10.

The system as so far described presents a television picture of a detected target on a cathode ray tube indicator 600. The rectangular raster has been a recognized limiting factor of the system, due to the distortion of the aspect of the target. The reason for the distortion is that obviously the zones of reception are fan or wedge shaped and not rectangular. This discrepancy in the presentation is therefore caused by the cartesian presentation of the polar information obtained from the fan or wedge shaped zones of transmission and reception. If, however, the wedge shape of the zones of reception were duplicated in the form of a wedge shaped raster on the cathode ray indicator the polar information received would be presented on polar coordinates, thereby indicating the aspect of a detected target correctly. It is, as aforementioned, one of the primary objects of the present invention to provide such a wedge shaped raster on a cathode ray tube indicator.

Referring again to FIG. 1, the apparatus used for the production of a wedge shaped raster is indicated in general at 80 and will now be described in detail. The reference characters in the 400 series are, as previously mentioned, utilized in the production of a vertical range trace on the cathode ray tube indicator 600 and as will now be described. The range sweep, and more particularly the voltage from saw-tooth generator 402, is utilized in another manner consistent with the present invention in producing a wedge shaped raster or scan to replace the conventional rectangular scan. This further purpose of the range sweep voltage is to apply it to the horizontal saw-tooth generator output, through circuit 80, as a means of modulating the horizontal saw-tooth sweep to vary its amplitude linearly in time consistent with producing the wedge scan.

The modulator circuit 80 functions in a manner to produce a linear modulated output to thereby give a symmetrical wedge scan. It has been found in the application of the vertical sweep voltage directly to the horizontal sweep voltage that a non-linear modulated output would arise. This gave an unsymmetrical wedge caused by the non-linearity characteristics of the modulating vacuum tubes employed. The manner of compensating for this unwanted characteristic will be explained in detail hereinafter.

In operation of the modulator circuit 80, as in a preferred instance to produce the wedge scan on the screen of cathode ray tube indicator 600, the voltage from the horizontal saw-tooth generator 305 $j$ and $k$ is not applied directly to the horizontal plates but rather in push-pull to the grids 26, 28 of tubes 2 and 3 and also to the grid 31 of tube 4a of modulator circuit 80. This voltage is modulated in modulator circuit 80 by the introduction thereto of the output of vertical saw-tooth generator 402. This range sweep voltage is applied to grids 27 and 29 of vacuum tubes 2a and 3a respectively.

Through modulator circuit 80 a linearly modulated voltage $l$ and $m$ is produced at the output of amplifier 406 and is applied in push-pull to the horizontal deflecting plates 602 and 604 of cathode ray indicator 600 through amplifier 406 as a push-pull deflection. With this voltage so introduced there forms on the cathode ray indicator 600 a horizontal beam trace whose width approximates zero at the lower center portion (zero range) of the screen and increases in amplitude linearly in time through the range sweep cycle producing a wedge scan thereon. The wedge scan is illustrated at 601 on the face of the cathode ray tube indicator 600.

In the preferred embodiment of the present invention vacuum tubes 2, 2a and 3, 3a are two expanders or modulators connected in push-pull. These tubes 2, 2a and 3, 3a are shown as double triodes, it being understood, however, that pentodes, tetrodes, etc., may be successfully employed in the circuit. In the connection of the circuit, tubes 2, 2a are provided with a common plate load resistance 38 and common cathode resistance 42. Likewise tubes 3 and 3a are also provided with a common plate load resistance 39 and cathode resistance 43. The combined output from tubes 2, 2a and 3, 3a is then applied via capacitors 46 and 47 to the primary of interstage transformer 50. Potentiometer 51 connected across the primary of transformer 50 is used to obtain balance.

The push-pull horizontal sweep voltage from saw-tooth generator 305 j and k, is fed to the grids 26 and 28 of tubes 2 and 3. The expanding control voltage obtained from the vertical range sweep is fed to grids 27 and 29, in parallel, of tubes 2a and 3a. In the operation of the system it is found desirable in the design of the vertical sweep saw-tooth oscillator to use a positive saw-tooth, that is, the saw-tooth which begins at a negative potential, going less negative through zero and then positive. On flyback the saw-tooth oscillator returns to the starting negative potential.

At the start of the range sweep when the vertical sweep saw-tooth oscillator 402 is at a high negative voltage tubes 2a and 3a are biased to plate current cutoff. At this instance tubes 2 and 3 are operating normally and delivering full voltage output. As the vertical sweep saw-tooth oscillator goes less negative the bias on tubes 2a and 3a is decreased, and tubes 2a and 3a begin to conduct. As this occurs, tubes 2a and 3a receive saw-tooth signal excitation from tubes 2 and 3 respectively through cathode resistors 42 and 43. The output of tubes 2 and 2a and also from tubes 3 and 3a appear 180° out of phase and since their plates are tied together these two outputs tend to buck one another, reducing the resultant output.

As the vertical range sweep voltage goes less negative the bias on tubes 2a and 3a is decreased further and their amplification is increased. The resultant output decreases accordingly until there appears a positive bias on tubes 2a and 3a. When this occurs tubes 2a and 3a are drawing plate current to such an extent that the voltage drop across the respective cathode resistors 42 and 43 is enough to block corresponding tubes 2 and 3. As this is done signal coupling between tubes 2 and 2a and also between tubes 3 and 3a is blocked off and the resultant output from the tied plates drops to substantially zero.

The combined output from tubes 2, 2a and 3, 3a produces a linear modulated output over a wide output voltage range and is symmetrical about zero bias value but inverted in amplitude variation from what is needed to produce a wedge shaped scan on the indicator 600, that is the scanned wedge would be at its greatest amplitude at the screen's lower center and decreasing in amplitude until near zero at the screen's upper edge.

As a means of overcoming this condition a bucking circuit associated with vacuum tube 4, 4a is incorporated to coact with the expanding circuit associated with tube 2, 2a and 3, 3a. The incoming voltage from the horizontal saw-tooth sweep oscillator 305 is applied unmodulated to grid 31 of tube 4a to produce an output voltage of constant amplitude, while the combined modulated output from tubes 2, 2a and 3, 3a is applied through transformer 50 and potentiometer 52 to the grid 30 of tube 4. These two separate signals are combined in common plate resistance 40 of tube 4. The signals being of 180° phase difference will tend to buck one another. This resultant output will then be the inverse of the output of the expander circuit. The scanned wedge being in the desired position relative to the screen.

The condenser 48 and the resistor 41 in the grid lead of tube 4a are essential to eliminate relative phase shifts between the expander and controlled gain circuits. Without these components it was found that a zero output level could not be realized. The values of this RC network are determined empirically and in the preferred embodiment condenser 48 is .0025 microfarad and resistor 41 is 33,000 ohms. Resistor 40 is a conventional plate load resistor, and resistors 44 and 45 are conventional cathode resistors.

The manner of detecting a target and its presentation on the cathode ray tube is similar to that described above and more fully described in the aforementioned co-pending application. The appearance of echoes are presented as to their relative bearings in respect to the transducer heading, on the cathode ray tube indicator 600.

As a means of rendering information presented by incoming echoes on the wedged shape raster intelligible, there is mounted over the face of the cathode ray tube indicator a calibrated screen illustrated in FIG. 2, to which reference is now had. The inverted isosceles triangle D, E and F is a face plate with cord dimension calibrated in degrees, so to represent relative bearing of a target. Lines $u$, $v$, $w$, $y$ and $z$ correspond to bearing, so that the bearing of a target becomes immediately intelligible at any range. The line $w$ corresponds to 0° bearing; $v$ to $-5°$, $u$ to $-10°$, $y$ to $+5°$ and $z$ to $+10°$ and so on. These lines all converge to the lower apex of the raster to present a corrected means of determining the bearing of a target at any range. The radial dimension is calibrated to correspond to the vertical range sweep to represent the range of the target.

With the bearing and range of a target given directly from the screen of the cathode ray indicator, the aspect angle of the target, that is the angle between the target course and the transducer heading, is determined with the aid of cursor G of FIG. 2. The cursor G is a circular transparent disc with its outer edge calibrated in degrees, and mounted over the cathode ray tube indicator viewing screen in a manner to afford easability of revolving. Through the diameter of cursor G is drawn a center line corresponding to 0° from which similar parallel lines are drawn on each side. The number of lines is not critical and could be of any number so long as they are parallel.

To best explain the function of the cursor G a target is simulated upon the screen to represent a series of echos received from a suitable target such as from target X of FIG. 1, and received in a manner similar to that explained in conjunction with the copending application of H. L. Saxton, supra. Upon looking at target X in FIG. 2 its bearing and range immediately becomes obvious, the bearing is read from lines converging from the upper cord dimension to the lower apex, and the range is determined from the radial calibrations. The cursor is revolved until any one of the parallel lines thereon is parallel with, or over, the elongated target and in this case which happens to be the second line to the left of the center line. The aspect angle is then read from the cursor at the zero bearing line $w$ of the raster, and in this instance at 34° and 40″.

It may be preferred to gear the aspect cursor to a differential synchronous motor, rather than revolve it by hand. When the input to the differential synchro is fed from the ship's gyro, the output of the synchronous motor will be true target heading, or the course the target is steering.

Although we have shown and described a limited and specific embodiment of the present invention it must be understood that many modifications thereof would be possible without departing from the true spirit of the invention.

What is claimed is:

1. In combination, a pulse echo locator system comprising means for transmitting periodic impulses to remote objects, receiver means for receiving reflections therefrom comprising apparatus for providing at least one pair of directional overlapping zones of reception disposed in opposing angular relation about an axis of directivity, a cathode ray tube indicator means coupled to the output of said receiver means to indicate the phase relationship of the signal energy received by said opposing zones of reception comprising a low frequency deflection circuit for deflecting the electron beam of said cathode ray tube in a first direction in response to the emission of said periodic impulses, and means including a high frequency deflection circuit for simultaneously deflecting said electron beam in a second direction substantially at right angles to said first direction, said last named means further including a modulator circuit connected to said low frequency deflection circuit to uniformly increase the amplitude of electron beam deflection in said second direction synchronously with the beam deflection in said first direction.

2. In combination, a pulse echo locator system comprising means for transmitting periodic impulses to remote objects, receiver means for receiving reflections therefrom comprising apparatus for providing at least one pair of directional overlapping zones of reception disposed in opposing angular relation about an axis of directivity, a cathode ray tube indicator means coupled to the output of said receiver means to indicate the phase relationship of the signal energy received by said opposing zones of reception comprising a low frequency sawtooth generator means for deflecting the electron beam of said cathode ray tube in a first direction in response to the emission of said periodic impulses, and means including a high frequency deflection circuit means for simultaneously deflecting said electron beam in a second direction substantially at right angles to said first direction, said last named means further including a modulator circuit connected to the output of said low frequency saw-tooth generator to uniformly increase the amplitude of electron beam deflection in said second direction synchronously with the beam deflection in said first direction.

3. In combination, a pulse echo locator system comprising means for transmitting periodic impulses to remote objects, means for receiving the reflections therefrom comprising apparatus for providing at least one pair of overlapping zones of reception disposed in oppositely diverging relation about an axis of directivity, separate superheterodyne receiving channels for each zone of reception including separate local oscillators therefor, the local oscillators of opposing receiving channels being tuned to distinct frequencies of operation whereby opposing receiving channels thereby yield distinct intermediate frequencies, means heterodyning the local oscillators of opposing zones of reception together to yield a first frequency difference signal, means heterodyning the intermediate frequency outputs of the opposing zones of reception together to produce a second difference frequency signal, a cathode ray tube indicator means adapted to receive said first and second frequency difference signals and to indicate the phase relationship therebetween, comprising a low frequency deflection circuit for deflecting the electron beam of said cathode ray tube in a first direction in response to the emission of said periodic impulses, and means including a high frequency saw-tooth generator means responsive to said first difference frequency signal and a deflection amplifier connected to the output of said saw-tooth generator for simultaneously deflecting said electron beam in a second direction substantially at right angles to said first direction, said deflection amplifier including a modulator circuit connected to the output of said low frequency deflection circuit to uniformly increase the amplitude of electron beam deflection in said second direction synchronously with the beam deflection in said first direction.

4. In combination, a pulse echo locator system comprising means for transmitting periodic impulses to remote objects, means for receiving the reflections therefrom comprising apparatus for providing at least one pair of overlapping zones of reception disposed in oppositely diverging relation about an axis of directivity, separate superheterodyne receiving channels for each zone of reception including separate local oscillators therefor, the local oscillators of opposing receiving channels being tuned to distinct frequencies of operation whereby opposing receiving channels thereby yield distinct intermediate frequencies, means heterodyning the local oscillators of opposing zones of reception together to yield a first frequency difference signal, means heterodyning the intermediate frequency outputs of the opposing zones of reception together to produce a second difference frequency signal, a cathode ray tube indicator means adapted to receive said first and second frequency difference signals and to indicate the phase relationship therebetween, comprising means including a low frequency saw-tooth generator and a deflection amplifier for deflecting the electron beam of said cathode ray tube in a first direction in response to the emission of said periodic impulses, and means including a high frequency saw-tooth generator responsive to said first difference frequency signal and a deflection amplifier connected to the output of said saw-tooth generator for simultaneously deflecting said electron beam in a second direction substantially at right angles to said first direction, said high frequency deflection amplifier including a modulator circuit connected to said low frequency saw-tooth generator to uniformly increase the amplitude of beam deflection in said second direction synchronously with the beam deflection in said first direction.

5. In combination a locator system, comprising means to provide at least one pair of directional overlapping zones of receptivity disposed in oppositely diverging relation about an axis of directivity, separate superheterodyne receiving channels for each zone of receptivity including separate local oscillators therefor, the local oscillators of opposing receiving channels being tuned to distinct frequencies of operation whereby said opposing receiving channels are endowed with distinct intermediate frequencies, means heterodyning together the local oscillator signals of opposing receiving channels thereby to yield a first difference frequency signal of reference phase, a cathode ray tube indicator, including a low frequency saw-tooth generator for deflecting the electron beam of said cathode ray tube in a first direction and a high frequency saw-tooth generator means responsive to said local oscillator difference signal for deflecting the electron beam of said indicator tube in a second direction substantially at right angles to the first direction, said last named means further including a modulator circuit responsive to said low frequency saw-tooth generator to uniformly increase the amplitude of beam deflection in said second direction synchronously with the beam deflection in said first direction, means combining the intermediate frequency signals derived from opposing receiving channels thereby to produce a second difference frequency signal whose phase relative to the local oscillator difference signal is governed by the direction of arrival of an incoming signal, and means applying said second difference frequency signal to said cathode ray tube to indicate the phase thereof relative to the phase of the first difference signal.

6. In combination, a locator system comprising means providing at least one pair of directional overlapping zones of receptivity disposed in oppositely diverging relation about an axis of directivity, separate superheterodyne receiving channels for each zone of reception including separate local oscillators therefor, the local oscillators of opposing receiving channels being tuned to distinct frequencies of operation whereby said opposing receiving channels are endowed with distinct intermediate frequencies, means heterodyning the local oscillator signals of opposing channels thereby to yield a local oscillator difference signal, a cathode ray tube indicator including a low frequency saw-tooth generator for deflecting the electron beam of said cathode ray tube in a first direction and a high frequency saw-tooth generator means responsive to said local oscillator difference signal for deflecting the electron beam of said indicator tube in a second direction substantially at right angles to the first direction, said last named means further including a modulator circuit responsive to said low frequency saw-tooth generator to uniformly increase the amplitude of beam deflection in said second direction synchronously with the beam deflection in said first direction, a beam intensifying electrode for said indicator means, means converting the intermediate frequency signals of said channels into pulse signals, means including mixer means for combining the intermediate frequency pulse signals of opposing channels to derive a pulse frequency difference signal whose phase relative to the local oscillator difference signal is governed by the direction of arrival of an incoming signal, and means applying said pulse frequency difference signal to the intensifying electrode of said cathode ray tube indicator to indicate the phase thereof relative to the phase of the first difference signal.

References Cited by the Examiner

UNITED STATES PATENTS

| | | | |
|---|---|---|---|
| 2,304,965 | 12/1942 | Sproule | 340—6 X |
| 2,370,426 | 2/1945 | Schade | 315—26 |
| 2,407,281 | 9/1946 | Johnson et al. | 343—118 |
| 2,498,381 | 2/1950 | Smith | 343—17.1 |
| 2,502,938 | 4/1950 | Fryklund et al. | 340—3 |
| 2,516,389 | 7/1950 | Hurvitz | 343—118 |
| 2,541,030 | 2/1951 | Busignies | 343—11 |
| 2,566,332 | 9/1951 | Huber et al. | 343—11 |
| 2,666,192 | 1/1954 | Hunt | 340—6 |

CHESTER L. JUSTUS, *Primary Examiner.*

NORMAN H. EVANS, *Examiner.*

J. R. SPALLA, P. H. BLAUSTEIN, D. G. BREKKE, R. A. FARLEY, *Assistant Examiners.*